United States Patent
Springer et al.

(10) Patent No.: US 6,314,737 B1
(45) Date of Patent: Nov. 13, 2001

(54) INTERNAL COMBUSTION ENGINE HAVING AN ACTIVATABLE BOOST AIR DELIVERY CAPACITY ADJUSTING

(75) Inventors: Ulrich Springer, Stuttgart; Joachim Wiltschka, Fellbach, both of (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 09/484,110

(22) Filed: Jan. 14, 2000

(30) Foreign Application Priority Data

Jan. 14, 1999 (DE) .............................. 199 01 069

(51) Int. Cl.$^7$ .............................. F02B 33/44; F02D 23/00
(52) U.S. Cl. ................... 60/612; 60/602; 60/600; 60/601; 60/603; 123/564
(58) Field of Search ............... 60/602, 600, 601, 60/603, 612; 123/564

(56) References Cited

U.S. PATENT DOCUMENTS

| | | | |
|---|---|---|---|
| 5,031,406 | * 7/1991 | Akiyama | 60/602 |
| 5,083,543 | 1/1992 | Harada et al. | |
| 5,090,204 | 2/1992 | Bonitz et al. | 123/562 |
| 5,186,081 | * 2/1993 | Richardson et al. | 123/564 |
| 5,502,966 | * 4/1996 | Unland et al. | 60/603 |
| 5,729,980 | * 3/1998 | Mackay | 60/602 |
| 5,782,092 | * 7/1998 | Schultalbers et al. | 60/602 |
| 5,845,495 | 12/1998 | Schray et al. | 60/612 |
| 5,850,737 | 12/1998 | Aschner et al. | 60/602 |

FOREIGN PATENT DOCUMENTS

| | | |
|---|---|---|
| 30 02 701 | 7/1981 | (DE) . |
| 38 32 965 | 4/1990 | (DE) . |
| 39 42 499 | 6/1991 | (DE) . |
| 195 13 156 | 5/1996 | (DE) . |
| 195 31 871 | 11/1996 | (DE) . |
| 195 47 994 | 6/1997 | (DE) . |
| 197 43 667 | 4/1999 | (DE) . |
| 198 10 174 | 4/1999 | (DE) . |
| 198 27 627 | 12/1999 | (DE) . |
| 0 780 555 | 6/1997 | (EP) . |
| 10-47071 | 2/1998 | (JP) . |
| 10047071 | 2/1998 | (JP) . |
| 90/03503 | 4/1990 | (WO) . |

* cited by examiner

*Primary Examiner*—Thomas Denion
*Assistant Examiner*—Thai-Ba Trieu
(74) *Attorney, Agent, or Firm*—Kenyon & Kenyon

(57) ABSTRACT

An internal combustion engine having one or more parallel exhaust-driven turbochargers that each comprise an activatable delivery capacity adjusting unit for variable adjustment of the boost air delivery capacity with malfunction monitoring of each individual delivery capacity adjusting unit wherein, upon detection of a malfunction of a respective delivery capacity adjusting unit, a corresponding malfunction datum is emitted.

16 Claims, 1 Drawing Sheet

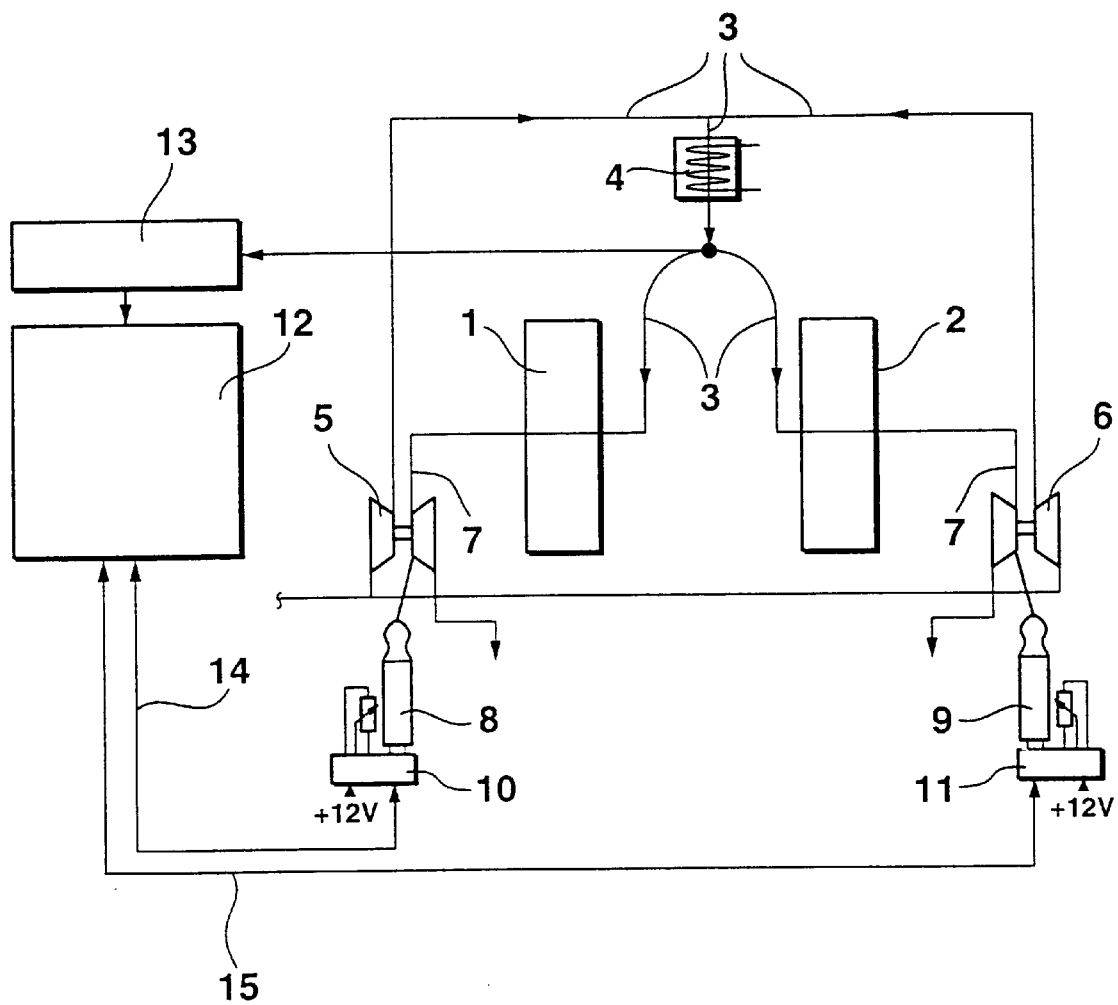

INTERNAL COMBUSTION ENGINE HAVING AN ACTIVATABLE BOOST AIR DELIVERY CAPACITY ADJUSTING

FIELD OF THE INVENTION

The present invention relates to an internal combustion engine having an exhaust-driven turbocharger or multiple parallel exhaust-driven turbochargers that each comprise an activatable delivery capacity adjusting unit for variable adjustment of the boost air delivery capacity, and means for individual malfunction monitoring of each individual delivery capacity adjusting unit which, upon detection of a malfunction of a respective delivery capacity adjusting unit, emit a corresponding malfunction datum. Exhaust-driven turbochargers of this kind, in which the boost air delivery capacity can be varied, make it possible to adapt the efficiency of the turbocharger to the operating point of the internal combustion engine, and thus to optimize the response characteristics, fuel consumption, and emissions of the internal combustion engine.

BACKGROUND OF THE INVENTION

An internal combustion engine is described in German Patent Application No. DE 30 02 701 A1, which describes an internal combustion engine having an exhaust-driven turbocharger that has a shiftable turbine guide mechanism. A computer unit is associated with the internal combustion engine in order to control the delivery of boost air as a function of engine operation. Shifting of the turbine guide mechanism is regulated by way of the computer unit, by the fact that it defines set points. At the same time, an instantaneous actuating movement of actuating elements on the turbine guide apparatus is conveyed to the computer unit. To monitor the functioning of the exhaust-driven turbocharger, monitoring sensors are provided to ascertain the turbine rotation speed, lubricating oil temperature, and wear phenomena or imbalances. If the signal of a monitoring sensor deviates impermissibly from a set point, the computer unit prepares a malfunction indication datum.

German Patent Application No. DE 39 42 499 A1 describes controlling the air throughput of a common intake air line, downstream from two parallel exhaust-driven turbochargers, of an internal combustion engine by way of electrical valves, in order to adapt the turbocharger output optimally to the engine's operating state.

German Patent No. DE 195 31 871 C1 describes an internal combustion engine having an exhaust-driven turbocharger whose turbine has a turbine guide mechanism with which the incident flow direction of the exhaust gases onto the turbine blades, and the incident flow cross section itself, can be varied. The turbine guide mechanism is adjustable via an actuating motor for whose function a control unit is provided. The control unit with actuating motor makes it possible, by displacing the turbine guide mechanism, to regulate the instantaneous boost pressure sensed by way of a pressure sensor. This makes it possible to establish boost pressure set points which correspond to a favorable boost pressure characteristics diagram that depends on the engine speed and injected fuel volume.

German Patent Application No. DE 195 47 994 A1 describes an internal combustion engine having two exhaust-driven turbochargers, working in parallel, which deliver fresh air into a common intake system or alternatively into two separate intake systems for two cylinder banks of the internal combustion engine. A similar arrangement having two parallel turbochargers for separate intake sections is disclosed in German Patent Application No. DE 38 32 965 A1; in this, by way of a pressure sensor and a differential pressure sensor or by way of a single pressure sensor that can selectably be switched to one of the two intake sections at a time, the pressures in the intake sections are sensed and can thus be regulated to identical pressure values.

With the conventional arrangements having two parallel turbochargers delivering into one common intake line, it is possible with a conventional boost pressure control system only to ensure that the desired boost pressure is reached; it is not possible, however, to ascertain the weighting with which the two turbochargers contribute to creation of the boost pressure. In normal operation, with an engine configuration that is symmetrical in terms of air delivery and with identical exhaust gas angles of incidence for the two turbochargers, it can be assumed that the contributions of the two turbochargers are identical. If, however, an electrical or mechanical fault occurs in the delivery capacity adjusting unit of one or both turbochargers, this can result, even though the overall delivered volume is correct, in highly inhomogeneous delivery capacities for the two turbochargers; this cannot be detected by the boost pressure control system and results in a malfunction that can cause mechanical damage to one or both turbochargers.

SUMMARY OF THE INVENTION

The present invention provides an internal combustion engine having one or more parallel exhaust-driven turbochargers in which the function of a turbocharger can reliably be monitored with little complexity.

Specifically, the present invention provides an internal combustion engine having an exhaust-driven turbocharger or multiple parallel exhaust-driven turbochargers (5, 6) that each comprise an activatable delivery capacity adjusting unit (8, 9) for variable adjustment of the boost air delivery capacity. Devices (10, 11) for individual malfunction monitoring of each individual delivery capacity adjusting unit (8, 9) are provided which, upon detection of a malfunction of a respective delivery capacity adjusting unit (8, 9), emit a corresponding malfunction datum. The respective delivery capacity adjusting unit (8, 9) has a shifting apparatus for shifting the incident flow angle for the exhaust gas flow onto the turbine blades and an incident flow angle control unit for the turbine blades. Devices (10, 11) for malfunction monitoring are designed so that they ascertain whether the incident flow angle control unit is establishing the incident flow angle, by way of the shifting apparatus, at a definable set point within a definable time period, and they emit the malfunction data if such is not the case.

In one embodiment of the present invention, the respective delivery capacity adjusting unit has a shifting apparatus for shifting the incident flow angle for the exhaust gas flow onto the turbine blades, and an incident flow angle control unit for the turbine blades; and the devices for malfunction monitoring are designed so that they ascertain whether the incident flow angle control unit for the turbine blades is establishing the incident flow angle, by way of the shifting apparatus, at a definable set point within a definable time period, and they emit the malfunctions data if such is not the case.

In another embodiment of the present invention, the devices for malfunction monitoring contain a differential pressure sensor for sensing the boost pressure difference between at least two of the multiple parallel exhaust-driven turbochargers, and emit a malfunction datum if the measured pressure difference is greater than a predefinable pressure difference threshold value. This makes it possible to implement a very accurately applicable boost pressure control system in which only a small safety margin with respect to the exhaust-driven turbocharger pump limit must be maintained.

In another embodiment of the present invention, the malfunction datum is sent by the devices for malfunction monitoring as a signal onto a data bus or as a periodic ground scanning signal onto an electrical control line over which the activation signals for the delivery capacity adjusting unit are transferred in the opposite direction. This creates an easy capability for transferring malfunction data.

In another embodiment of the present invention, the internal combustion engine has at least two parallel exhaust-driven turbochargers whose boost air outlet sides are guided to a common intake duct segment of the internal combustion engine and with which a boost pressure control loop, having a sensor that senses the boost pressure in the common intake duct segment, is associated. Also provided is a boost pressure controller, which activates the delivery capacity adjusting units as a function of the boost pressure sensor output signal, for establishing predefined boost pressure set points. The result is to create a boost pressure-regulated exhaust-driven turbocharger system which, despite the fact that boost air is delivered through multiple parallel turbochargers into a common intake duct system, provides functional monitoring of each individual exhaust-driven turbocharger.

An exemplary embodiment of the invention is depicted in the drawings and will be described below.

BRIEF DESCRIPTION OF THE DRAWINGS

FIG. 1 is a block diagram of an internal combustion engine having two parallel exhaust-driven turbochargers according to the present invention.

DETAILED DESCRIPTION OF THE INVENTION

FIG. 1 schematically depicts a left-hand and a right-hand cylinder bank 1, 2 of an internal combustion engine which are supplied with intake air through a common intake air line system 3 with which a boost air cooler 4 is associated. Intake air line system 3 is furnished with compressed fresh air through two parallel exhaust-driven turbochargers 5, 6 which are driven, via exhaust-gas turbines, by the exhaust gas of the respective cylinder bank 1, 2 flowing in exhaust lines 7.

In order to establish the boost pressure in intake air line system 3 at a value in the engine characteristic diagram that is favorable for functioning of the internal combustion engine, mechanical displacing apparatuses 8, 9, which serve to adjust the incident flow angle of the exhaust gas on the turbine blades and thus permit adjustment of the boost air delivery in capacity, are provided for each of the exhaust-driven turbochargers. Associated with each mechanical displacing apparatus 8, 9, in order to implement a turbine blade position control loop, is an incident flow angle control unit 10, 11 for the turbine blades, preferably integrated into a central engine control unit, which activates the respective displacing apparatus 8, 9 in order to establish a blade position set point that is determined by a higher-order boost pressure controller 12 implemented in the engine control unit and that is conveyed as the manipulated variable to the respective incident flow angle control unit 10, 11 via control lines 14, 15, preferably in the form of a pulse-width modulated signal. The boost pressure is sensed via a boost pressure sensor 13 in intake line system 3, and conveyed to boost pressure controller 12 as the feedback variable.

For the above-described configuration having the delivery capacity adjusting units in the form of the turbine blade position control loops with the incident flow angle control units and the mechanical blade displacing apparatuses electrically activated thereby, provision is made for a fault report from the position control loops, preferably to the engine control unit containing boost pressure controller 12, in order to provide malfunction monitoring of the two turbochargers 5, 6. In the position control loops, this function message is capable of detecting whether the desired turbine blade position can be established by the relevant position control loop within a definable time period. If such is not the case, it is concluded that a fault exists, and a corresponding fault datum is emitted.

To reduce the wiring complexity, this fault report occurs, in the present example, as a malfunction signal reported back on the relevant control line 14, 15. For this purpose, control lines 14, 15 are suitably designed for bidirectional signal transmission. One exemplary procedure involves transmitting the fault datum, by ground scanning of the relevant control line 14, 15 in position control circuit 8, 10 and 9, 11, via the same line, so that it can be distinguished from the pulse-width modulated manipulated variable signals from boost pressure controller 12 to the respective position control circuit. To distinguish the reported-back fault datum from defects on control lines 14, 15 that are routinely monitored, for example line short circuits or line breakages, the fault datum is transmitted by periodic ground scanning at characteristic time intervals of, for example, 100 ms to 500 ms.

In an alternative embodiment of the present invention, provision is made for connecting boost pressure controller 12 and incident flow angle control unit 10 and 11 to one another via a CAN bus system. In both this case and the exemplary embodiment described above, an expanded data transfer protocol can be defined in order to allow transmission of further diagnostic data from the respective incident flow angle control units 10, 11 to the engine control unit.

In a further modified embodiment of the present invention, provision is made for the function of each exhaust-driven turbocharger, specifically of a delivery capacity adjusting unit, to be monitored by way of additional sensor technology, e.g. by way of air mass sensors such as hot air mass sensors, to ascertain the air mass delivered by each turbocharger 5, 6. Alternatively, a differential pressure sensor can be provided, with which the differential pressure upstream from the two turbochargers 5, 6 is monitored.

According to the present invention devices are provided for individual malfunction monitoring of each individual delivery capacity adjusting unit of preferably multiple parallel exhaust-driven turbochargers, which emit a corresponding malfunction datum when a malfunction of a respective delivery capacity adjusting unit is detected. It is possible thereby to detect corresponding malfunctions of one of multiple parallel delivery capacity adjusting units even if the overall desired delivery capacity of multiple parallel turbochargers is nevertheless being provides.

What is claimed is:

1. An internal combustion engine comprising:
   at least one turbocharger driven by an exhaust gas flow of the engine, the at least one turbocharger including:
   a plurality of turbine blades;
   an activatable delivery capacity adjusting unit for variable adjustment of a boost air delivery capacity, the adjusting unit including a shifting apparatus for shifting an incident flow angle of the exhaust gas flow into the plurality of turbine blades and an incident flow angle control unit for controlling the shifting apparatus;

a monitoring device for monitoring the adjusting unit for a malfunction, the device ascertaining whether the incident flow angle deviates from a predefined set flow angle within a predefined time period, and if so, emits a malfunction datum.

2. The internal combustion engine as recited in claim 1 wherein the at least one turbocharger comprises a plurality of turbochargers functioning in parallel.

3. The internal combustion engine as recited in claim 2 wherein each turbocharger further comprises a boost outlet side, and wherein at least two of the parallel turbochargers have their boost outlet sides facing a common intake duct segment of the engine.

4. The internal combustion engine as recited in claim 3 further comprising a boost pressure sensor for sensing a boost pressure in the common intake duct section, and a boost pressure controller for adjusting an adjusting unit as a function of an output signal of the boost pressure sensor.

5. The internal combustion engine as recited in claim 2 wherein the monitoring includes a differential pressure sensor for sensing a pressure difference between a first boost pressure of a first of the plurality of turbochargers and a second boost pressure of a second of the plurality of turbochargers, and wherein the malfunction datum is emitted if the pressure difference exceeds a predetermined pressure difference value.

6. The internal combustion engine as recited in claim 2 wherein the monitoring device includes a plurality of air mass sensors for sensing a boost air mass delivered by the plurality of turbochargers and wherein the monitoring device emits the malfunction datum if the boost air mass deviates from a predefined boost air mass threshold value by more than a predefined value.

7. The internal combustion engine as recited in claim 1 further comprising a data bus and wherein the monitoring device sends the malfunction datum as a signal onto the data bus.

8. The internal combustion engine as recited in claim 1 further comprising an electric control line and wherein the adjusting unit sends activation signals over the electric control line in a first direction.

9. The internal combustion engine as recited in claim 8 wherein the monitoring device sends the malfunction datum as a periodic ground scanning signal over the electrical control line in a second direction, the second direction being opposite to the first direction.

10. The internal combustion engine as recited in claim 1 wherein the monitoring detector includes an air mass sensor for sensing a boost air mass delivered by the turbocharger and wherein the monitoring detector emits the malfunction datum if the measured boost air mass deviates persistently from a predefined boost air mass set point by more than a predefined value.

11. An internal combustion engine comprising:

a plurality of parallel turbochargers, each turbocharger driven by an exhaust gas flow of the engine and including:

a plurality of turbine blades;

an activatable delivery capacity adjusting unit for variable adjustment of a boost air delivery capacity;

a monitoring device for monitoring the adjusting unit for a malfunction, the monitoring device including a differential pressure sensor for sensing a pressure difference between a first boost pressure of a first of the plurality of turbochargers and a second boost pressure of a second of the plurality of turbochargers, and wherein the malfunction datum is emitted if the pressure difference exceeds a predetermined pressure difference value.

12. The internal combustion engine as recited in claim 11 wherein each turbocharger further comprises a boost outlet side, and wherein at least two of the parallel turbochargers have their boost outlet sides facing a common intake duct segment of the engine.

13. The internal combustion engine as recited in claim 12 further comprising a boost pressure sensor for sensing a boost pressure in the common intake duct section, and a boost pressure controller for adjusting an adjusting unit as a function of an output signal of the boost pressure sensor.

14. The internal combustion engine as recited in claim 11 wherein the monitoring detector includes an air mass sensor for sensing a boost air mass delivered by one of the plurality of turbochargers and wherein the monitoring detector emits the malfunction datum if the measured boost air mass deviates persistently from a predefined boost air mass set point by more than a predefined value.

15. The internal combustion engine as recited in claim 11 further comprising an electric control line and wherein the adjusting unit sends activation signals over the electric control line in a first direction.

16. The internal combustion engine as recited in claim 15 wherein the monitoring device sends the malfunction datum as a periodic ground scanning signal over the electric control line in a second direction, the second direction being opposite to the first direction.

* * * * *